United States Patent
Moriai et al.

(10) Patent No.: US 7,206,486 B2
(45) Date of Patent: Apr. 17, 2007

(54) OPTICAL AMPLIFICATION FIBER, OPTICAL FIBER AMPLIFIER, AND OPTICAL COMMUNICATION SYSTEM

(75) Inventors: Yoko Moriai, Tokyo (JP); Keiichi Aiso, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 28 days.

(21) Appl. No.: 11/104,563

(22) Filed: Apr. 13, 2005

(65) Prior Publication Data

US 2005/0232562 A1    Oct. 20, 2005

(30) Foreign Application Priority Data

Apr. 14, 2004    (JP)    ............................. 2004-118544

(51) Int. Cl.
*G02B 6/036*    (2006.01)
(52) U.S. Cl. .................. 385/127; 385/123; 385/126; 359/341
(58) Field of Classification Search ......... 385/123–129
See application file for complete search history.

(56) References Cited

U.S. PATENT DOCUMENTS

| | | | |
|---|---|---|---|
| 6,400,877 B1 * | 6/2002 | Kato et al. | ................... 385/123 |
| 6,574,406 B2 * | 6/2003 | Ainslie et al. | .............. 385/123 |
| 6,804,046 B2 | 10/2004 | Kakui et al. | |
| 6,903,866 B2 * | 6/2005 | Aiso | ....................... 359/341.1 |
| 2003/0128421 A1 | 7/2003 | Aiso | |

FOREIGN PATENT DOCUMENTS

| JP | 2002-151772 | 5/2002 |
|---|---|---|
| JP | 2004-004772 | 1/2004 |

* cited by examiner

*Primary Examiner*—Jennifer Doan
(74) *Attorney, Agent, or Firm*—Oblon, Spivak, McClelland, Maier & Neustadt, P.C.

(57) ABSTRACT

An optical amplification fiber for an optical fiber amplifier that amplifies a signal light using a pumping light has an absorption coefficient that satisfies conditional relations $\alpha s \geq 2.0$ dB/m and $\alpha p/\alpha s \geq -0.0697 \times \alpha s + 1.30$, where $\alpha p$ is the absorption coefficient in a pumping light wavelength band, and $\alpha s$ is the absorption coefficient in a signal light wavelength band.

16 Claims, 6 Drawing Sheets

OPTICAL AMPLIFICATION FIBER, OPTICAL FIBER AMPLIFIER, AND OPTICAL COMMUNICATION SYSTEM

BACKGROUND OF THE INVENTION

1) Field of the Invention

The present invention relates to an optical fiber applied to an optical amplifier suitable for optical communications and other related applications.

2) Description of the Related Art

In the field of recent optical communication systems, research and development in wavelength division multiplexing (WDM) transmission and building of optical communication networks using the WDM technology is now in progress. The WDM technology is inevitable for developing a large-capacity communication system.

An erbium-doped fiber (EDF), which is manufactured by doping element erbium (Er) into a core of a silica glass optical fiber, has an amplification band in a wavelength band of 1.55 micrometers that is the same as lowest loss band of the silica glass optical fiber. Furthermore, the EDF can take almost the same material and the same structure as an optical fiber for transmission, which makes it possible to realize a low connection loss when connecting with the optical fiber for transmission. For these reasons, the EDF is widely used as an optical amplification fiber for amplifying an optical signal in an optical transmission system.

An erbium-doped optical fiber amplifier (EDFA) employing the EDF has a high efficiency and a high gain, which can maintain a high-density pumping light and a signal light while overlapping the both in a long-haul transmission. The EDFA plays an important role as a key device in the WDM transmission system.

With the recent establishment of the WDM transmission technology, an introduction of the WDM transmission system became active in a long-haul large-capacity optical communication system, and a transmission capacity shows a continuing increase. Regarding such a WDM transmission, an experimental result of a transmission speed over terabit has been reported. When applying an optical amplification fiber, such as the EDF, in the long-haul high-speed large-capacity optical communication network, a high-quality optical amplification fiber is required.

One of the important parameters of a quality of amplification in the optical amplification fiber is the noise figure (NF). The noise characteristic of the optical amplification fiber is evaluated based on the NF.

One of the methods to reduce the NF is, as described in U.S. Pat. No. 6,804,046, to increase a ratio of an absorption coefficient $\alpha p$ in a pumping light wavelength band to an absorption coefficient $\alpha s$ in a signal light wavelength band. When the ratio $\alpha p/\alpha s$ is increased, the ratio of the population inversion increases whereby the NF is decreased.

Figure 3:
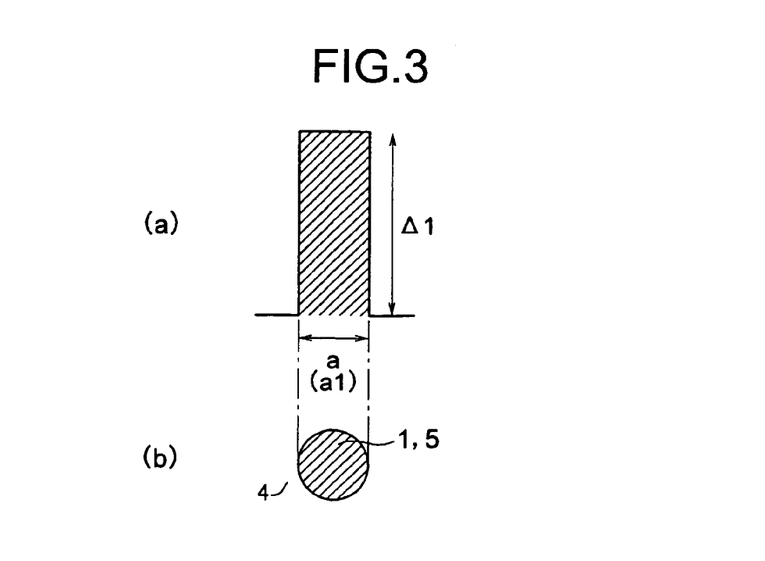
FIG. 3 is a schematic of a conventional step-index-type optical amplification fiber: (a) is a refractive index profile of the fiber; and (b) is a cross section of the fiber.
Figure 4:
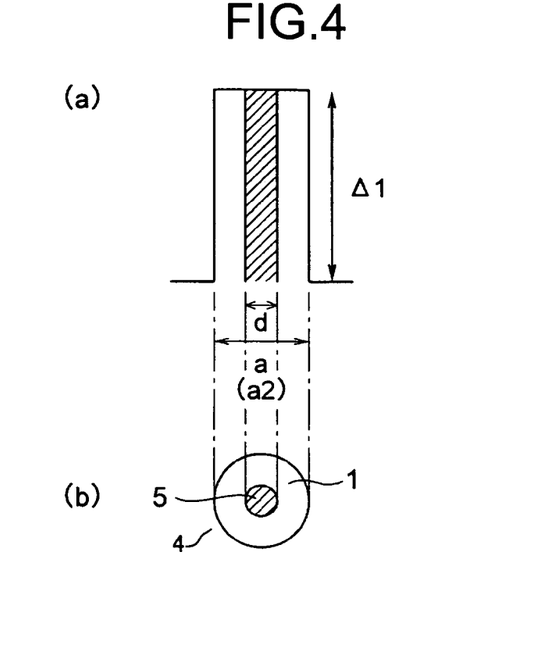
FIG. 4 is a schematic of a conventional center-doped-type optical amplification fiber: (a) is a refractive index profile of the fiber; and (b) is a cross section of the fiber.

One of the refractive index profiles of a general optical amplification fiber is a step-index type, as shown in FIG. 3 and FIG. 4. Regarding an area for doping a rare-earth element, a step-index type structure in which the rare-earth element is doped in an entire core 1 shown in. FIG. 3 (hereinafter, "step-index type") and a center-doped type structure in which the rare-earth element is doped only in a center part of a core 1 shown in FIG. 4 (hereinafter, "center-doped type") are popular. The hatched portions in FIG. 3 and FIG. 4 indicate areas in which the rare-earth element is doped. In an explanation for FIG. 3, FIG. 4, and FIG. 5, a description for an outer portion of a cladding 4 (specifically a third cladding 4 in FIG. 5) is omitted. In the technology disclosed in Japanese Patent Application Laid-Open No. 2002-151772, the center-doped type is mainly used.

However, in the conventional method disclosed in U.S. Pat. No. 6,804,046, it is necessary to narrow a rare-earth doped area in the center-doped type to increase the value of $\alpha p/\alpha s$. When the rare-earth doping area is narrowed, the absorption coefficient of the optical amplification fiber (absorption coefficient per unit length) becomes small. As a result, a length of the optical amplification fiber used must be longer to compensate for a decrease in the absorption coefficient.

Furthermore, in the center-doped type, it is difficult to match refractive indexes between the rare-earth doped area and a non-doped area in the core, resulting in a manufacturing problem.

SUMMARY OF THE INVENTION

It is an object of the present invention to solve at least the above problems in the conventional technology.

According to an aspect of the present invention, an optical amplification fiber for an optical fiber amplifier that amplifies a signal light using a pumping light, wherein an absorption coefficient of the optical amplification fiber satisfies conditional relations $\alpha s \geq 2.0$ dB/m and $\alpha p/\alpha s \geq -0.0697 \times \alpha s + 1.30$, where $\alpha p$ is the absorption coefficient in a wavelength band of the pumping light, and $\alpha s$ is the absorption coefficient in a wavelength band of the signal light.

According to another aspect of the present invention, an optical amplification fiber includes a core in which at least one rare-earth element is doped, the core having a first refractive index; a first cladding that surrounds the core, the first cladding having a second refractive index smaller than the first refractive index; a second cladding that surrounds the first cladding, the second cladding having a third refractive index bigger than the second refractive index and smaller than the first refractive index; and a third cladding that surrounds the second cladding, the third cladding having a fourth refractive index smaller than the third refractive index.

According to still another aspect of the present invention, an optical fiber amplifier includes the above optical amplification fiber.

According to still another aspect of the present invention, an optical communication system includes a transmitter that outputs a signal light; an optical fiber that propagates the signal light output from the transmitter; and the above optical fiber amplifier that amplifies the signal light using a pumping light.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained in detail with reference to the accompanying drawings.

Figure 1:
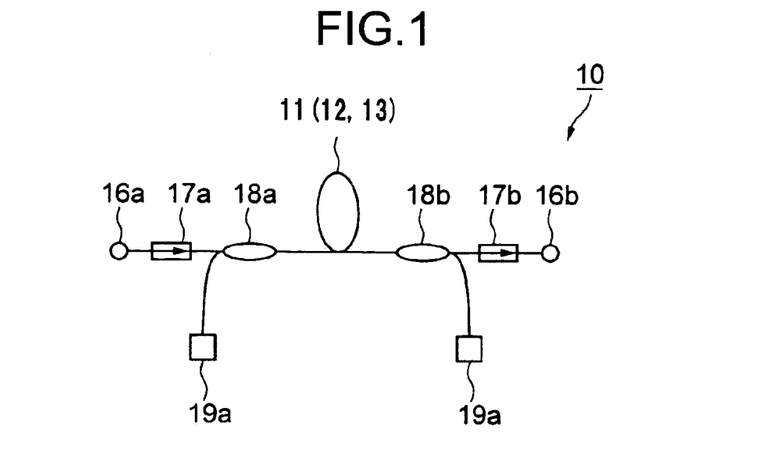
FIG. 1 is a schematic of an optical fiber amplifier according to an embodiment of the present invention.
Figure 2:
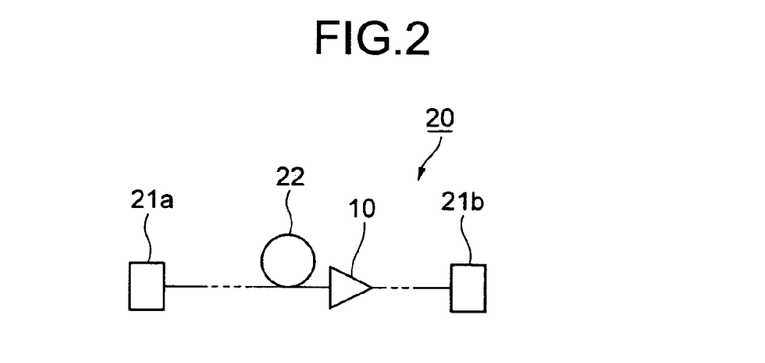
FIG. 2 is a schematic of an optical communication system employing the optical fiber amplifier shown in FIG. 1.

Any one of optical amplification fibers 11, 12, 13 according to the present invention can be applied to an optical fiber amplifier 10 shown in FIG. 1, and the optical fiber amplifier 10 is applied to an optical communication system 20 shown in FIG. 2.

The optical fiber amplifier 10 optically amplifies a signal light input, and outputs the amplified signal light. The optical fiber amplifier 10 includes an input terminal 16a that receives the signal light, an output terminal 16b that outputs the amplified signal light, an optical isolator 17a, 17b to true up a traveling direction of the signal light, a pumping light source 19a, 19b, a WDM coupler 18a, 18b to couple a pumping light from the pumping light source 19a, 19b to the signal light, and the optical amplification fiber 11 (or the optical fiber 12 or 13). The optical communication system 20 is for a long-haul transmission of the signal light, including a transmitter 21a that transmits the signal light, a receiver 21b that receives the signal light transmitted, an optical fiber transmission line 22 through which the signal light is transmitted, and the optical fiber amplifier 10 for amplification the signal light being transmitted.

First, a determination of a refractive index profile of the optical amplification fiber 11, 12, 13 is explained based on a numerical simulation, followed by an explanation for a performance evaluation for the optical amplification fiber 11, 12, 13 manufactured based on the refractive index profile determined by the numerical simulation.

Figure 5:
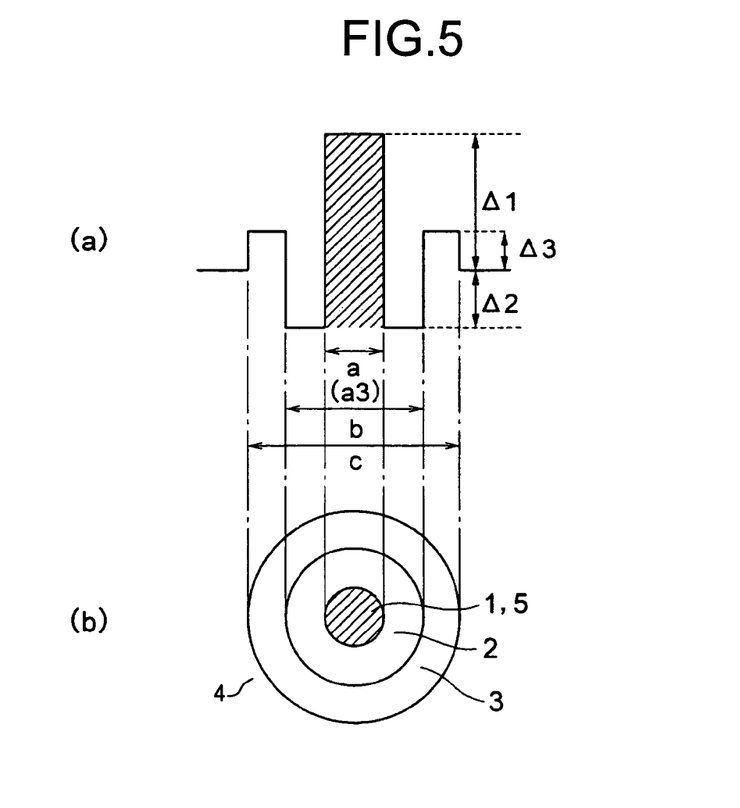
FIG. 5 is a schematic of a W-seg-type optical amplification fiber: (a) is a refractive index profile of the fiber; and (b) is a cross section of the fiber.

To determine the refractive index profile of the optical amplification fiber 11, an absorption coefficient α(λ) is obtained from equality (1):

$$\alpha(\lambda) = \rho_0 \sigma_a(\lambda) \frac{2}{\omega} \int \frac{\rho(r)}{\rho_0} \Psi(r) r \, dr \quad (1)$$

where $\rho_0$ is Er concentration, $\rho(r)$ is concentration distribution of rare-earth element, $\sigma_a(\lambda)$ is absorption cross-section, ω is power mode radius, $\Psi(r)$ is mode envelope, and a is an arbitrary value from among core diameters a1 to a3 shown in FIG. 3 to FIG. 5 (hereinafter, the core diameters a1 to a3 are referred to as a general term, "core diameter a"). If the concentration distribution of rare-earth element is uniform in the core, with a Gaussian approximation of the mode distribution, the equality (1) can be simplified as:

$$\alpha(\lambda) = \rho_0 \sigma_a(\lambda)\left[1 - \exp\left(-\frac{a^2}{\omega^2}\right)\right] \quad (2)$$

FIG. 3 is a schematic of a conventional step-index-type optical amplification fiber: (a) is a refractive index profile of the fiber; and (b) is a cross section of the fiber. FIG. 4 is a schematic of a conventional center-doped-type optical amplification fiber: (a) is a refractive index profile of the fiber; and (b) is a cross section of the fiber. FIG. 5 is a schematic of a W-seg-type refractive index profile used in the optical amplification fibers 11, 12, and 13: (a) is a refractive index profile of the fiber; and (b) is a cross section of the fiber. Hereinafter, an optical amplification fiber having a W-seg-type refractive index profile is simply referred to as a W-seg type.

Taking the EDF as an example, the power mode radius ω is obtained from the refractive index profile by using a numerical calculation. The power mode radius ω is then applied to the equality (2) to calculate the absorption coefficients $\alpha^{980}$ and $\alpha_{1530}$ at λ=980 nanometers and 1530 nanometers, respectively. Hereinafter, a pumping light wavelength and a signal light wavelength are set to 980 nanometers and 1530 nanometers, respectively. Although 980-nanometer-band and 1480-nanometer-band are generally used as the pumping light wavelength band for the EDF, it is known that a noise characteristic greatly depends on the pumping light wavelength band, and the pumping light in the 980-nanometer-band causes a lower noise than the 1480-nanometer-band. For this reason, the wavelength of 980 nanometers is used for the pumping light in the numerical simulation.

Figure 6:
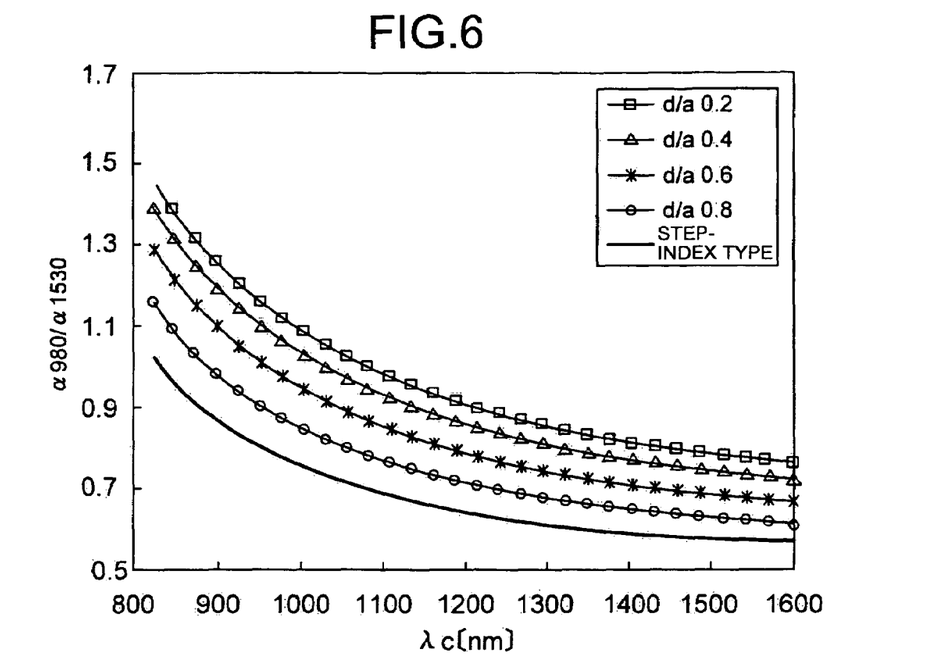
FIG. 6 is a graph of a cut-off wavelength λc dependence of $\alpha_{980}/\alpha_{1530}$ of the step-index type and the center-doped type.

A first numerical simulation is carried out for the conventional step-index type (see FIG. 3) and center-doped type (see FIG. 4), in which the core diameter a is changed to investigate a cut-off wavelength λc dependence of the ratio of the absorption coefficient $\alpha_{980}$ in the wavelength band of the pumping light to the absorption coefficient $\alpha_{1530}$ in a wavelength band of a signal light, $\alpha_{980}/\alpha_{1530}$. The rare-earth element to be doped is the Er, and Er concentration is 1000 wt.ppm. A relative refractive index difference of the core diameter a with the cladding, Δ1, is 1.0%, and a ratio of an Er-doped area diameter d in the center-doped type to the core diameter a, d/a, is set to four levels, 0.2, 0.4, 0.6, and 0.8. The cladding is considered to be substantially made of $SiO_2$, which means that the cladding does not contain a dopant, such as fluorine (F) and germanium (Ge), to greatly change a refractive index. (The cut-off wavelength λc is defined by ITU-T G.650; and other terminologies described below conform to a definition and a measurement method defined in ITU-T G.650.) A result of the first numerical simulation is shown in FIG. 6.

In an actual measurement, the Er-doped-area diameter d and the core diameter a in the first numerical simulation correspond to diameters at a position at which the refractive index becomes a half of the relative refractive index difference Δ1 shown in FIG. 3.

The relative refractive index difference Δ1 is defined by:

$$\Delta 1 = \{(n_{c1} - n_c)/n_{c1}\} \cdot 100 \quad (3)$$

where $n_{c1}$ is the maximum refractive index of the core, and $n_c$ is the refractive index of the cladding.

From the result of the first numerical simulation shown in FIG. 6, it is obvious that the center-doped type has a larger $\alpha_{980}/\alpha_{1530}$ than the step-index type. Besides, d/a of the center-doped type is smaller, which means that a relatively narrow Er-doped area can obtain a larger $\alpha_{980}/\alpha_{1530}$. When the cut-off wavelength λc is on a short wavelength side, $\alpha_{980}/\alpha_{1530}$ becomes large. Particularly, when the cut-off wavelength λc is 1100 nanometer or less, $\alpha_{980}/\alpha_{1530}$ shows a sudden increase.

A second numerical simulation is performed to investigate a cut-off wavelength λc dependence of $\alpha_{980}/\alpha_{1530}$ in the W-seg type shown in FIG. 5.

The cut-off wavelength λc dependence of $\alpha_{980}/\alpha_{1530}$ is investigated by fixing both a ratio of the core diameter a to the first cladding diameter b (Ra=a/b) and a ratio of the core diameter a to the second cladding diameter c (Rc=a/c) (Ra=0.8, Rc=0.48), and changing a ratio of a relative refractive index difference of the first cladding with the third cladding, Δ2, to the relative refractive index difference of the core with the third cladding Δ1(Δb=Δ2/Δ1) and a ratio of a relative refractive index difference of the second cladding with the third cladding, Δ3, to the relative refractive index difference of the core with the third cladding Δ1(Δc=Δ3/Δ1).

In this case, the relative refractive index difference of the core with the third cladding Δ1 is set to 1.0%, and the Er concentration is set to 1000 wt.ppm, which is uniformly doped in the core. The third cladding is substantially made of $SiO_2$.

In a practical situation, the relative refractive index difference Δ1 and the relative refractive index difference Δ3 are corresponding to the maximum relative refractive index difference, and the relative refractive index difference Δ2 is corresponding to the minimum relative refractive index difference.

In the refractive index profile of the W-seg type shown in FIG. 5, in the practical situation, the core diameter a is corresponding to a length of a line that connects positions at which the refractive index becomes a half of the relative refractive index difference Δ1 at a boundary between the core and the first cladding; the first cladding diameter b is corresponding to a length of a line that connects positions at which the refractive index becomes a half of the relative refractive index difference Δ2 at a boundary between the first cladding and the second cladding; and the second cladding diameter c is corresponding to a length of a line that connects positions at which the refractive index becomes one tenth of the relative refractive index difference Δ3 at a boundary between the second cladding and the third cladding.

The relative refractive index differences Δ2 and Δ3 are defined by the equalities (4) and (5). The equality (3) is used for the relative refractive index difference Δ1 with the refractive index of the third cladding as $n_c$.

$$\Delta 2 = \{(n_{c2} - n_c)/n_{c2}\} \cdot 100 \quad (4)$$

$$\Delta 3 = \{(n_{c3} - n_c)/n_{c3}\} \cdot 100 \quad (5)$$

where $n_{c2}$ is the minimum refractive index of the first cladding, $n_{c3}$ is the maximum refractive index of the second cladding, and $n_c$ is the refractive index of the third cladding.

Figure 7:
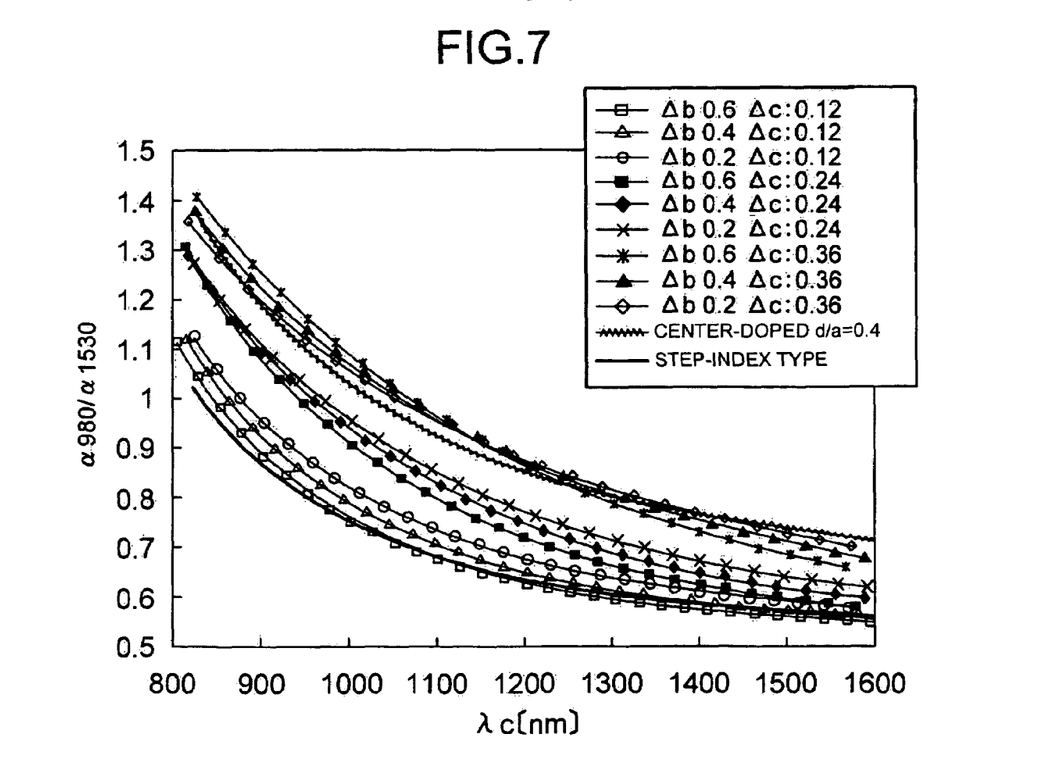
FIG. 7 is a graph of a cut-off wavelength λc dependence of $\alpha_{980}/\alpha_{1530}$ in the W-seg type by Δb(=Δ2/Δ1) and Δc(=Δ3/Δ1)

FIG. 7 is a graph of a cut-off wavelength λc dependence of $\alpha_{980}/\alpha_{1530}$ in the W-seg type by the relative refractive index differences Δ1, Δ2, and Δ3, as a result of the second numerical simulation.

The result of the second numerical simulation shown in FIG. 7 is similar to the result shown in FIG. 6. When the cut-off wavelength λc is on a short wavelength side, $\alpha_{980}/\alpha_{1530}$ becomes large, and particularly when the cut-off wavelength λc is 1100 nanometer or less, $\alpha_{980}/\alpha_{1530}$ shows a sudden increase. The results say that it is effective to set the cut-off wavelength λc on the short wavelength side to increase $\alpha_{980}/\alpha_{1530}$.

However, if the cut-off wavelength λc is set on an extremely short wavelength side, the effective refractive index of the core becomes small, and as a result, a light confinement in the core becomes weak, and in the worst case, it cannot function as an optical fiber. For this reason, there is a limit in increasing $\alpha_{980}/\alpha_{1530}$ by setting the cut-off wavelength λc on the short wavelength side.

On the other hand, because $\alpha_{980}/\alpha_{1530}$ increases as Δc increases, a change of Δc, rather than a change of Δb, can cause a larger change of $\alpha_{980}/\alpha_{1530}$. In this manner, in the refractive index profile of the W-seg type, each of the relative refractive index differences Δ1, Δ2, and Δ3 can be adjusted as desired. Therefore, with an appropriate adjustment of each of the relative refractive index differences Δ1, Δ2, and Δ3 (for example, if Δc is adjusted to 0.36 or more), it is possible to obtain a larger $\alpha_{980}/\alpha_{1530}$ than that of the center-doped type even if the cut-off wavelength λc is the same.

A third numerical simulation is performed to calculate a change of $\alpha_{980}/\alpha_{1530}$ according to the ratio of the core diameter a to the first cladding diameter b (Ra=a/b) and the ratio of the core diameter a to the second cladding diameter c (Rc=a/c).

First of all, Rc and each of the relative refractive index differences Δ1, Δ2, and Δ3 are fixed (Δb=0.4, Δc=0.36, Δ1=1.0, Δ2=−0.4, Δ3=0.36, and Rc=0.36) to investigate the change of $\alpha_{980}/\alpha_{1530}$ according to Ra. The Er concentration is set to 1000 wt.ppm, which is uniformly doped in the core. The third cladding is substantially made of $SiO_2$.

Figure 8:
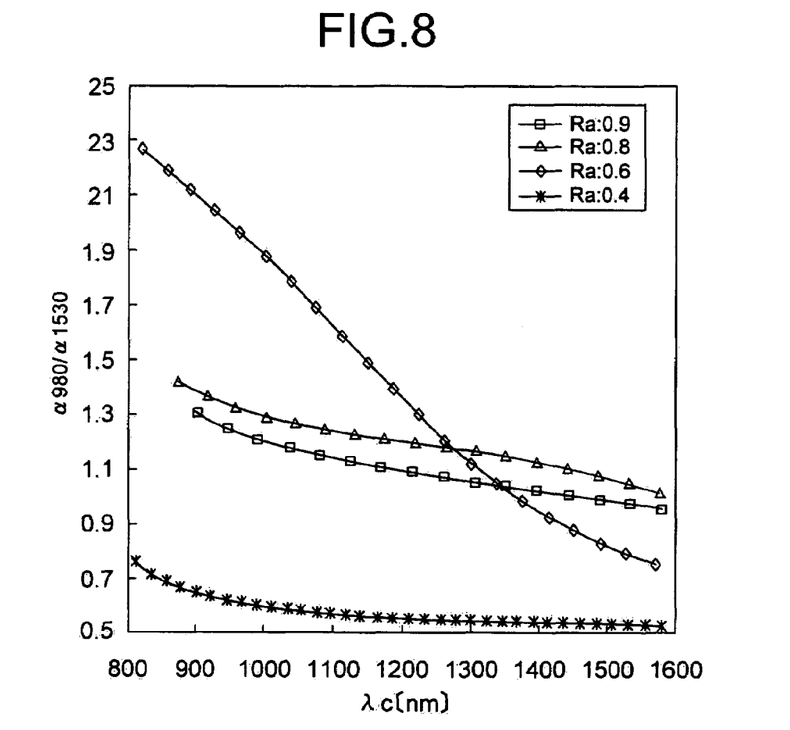
FIG. 8 is a graph of a cut-off wavelength λc dependence of $\alpha_{980}/\alpha_{1530}$ in the W-seg type by Ra (=a/b)

FIG. 8 is a graph of a cut-off wavelength λc dependence of $\alpha_{980}/\alpha_{1530}$ in the W-seg type when Ra is changed. As shown in FIG. 8, $\alpha_{980}/\alpha_{1530}$ becomes large if the cut-off wavelength λc is on the short wavelength side regardless of a value of Ra. However, the cut-off wavelength dependence of $\alpha_{980}/\alpha_{1530}$ shows a great change with the change of Ra.

Figure 9:
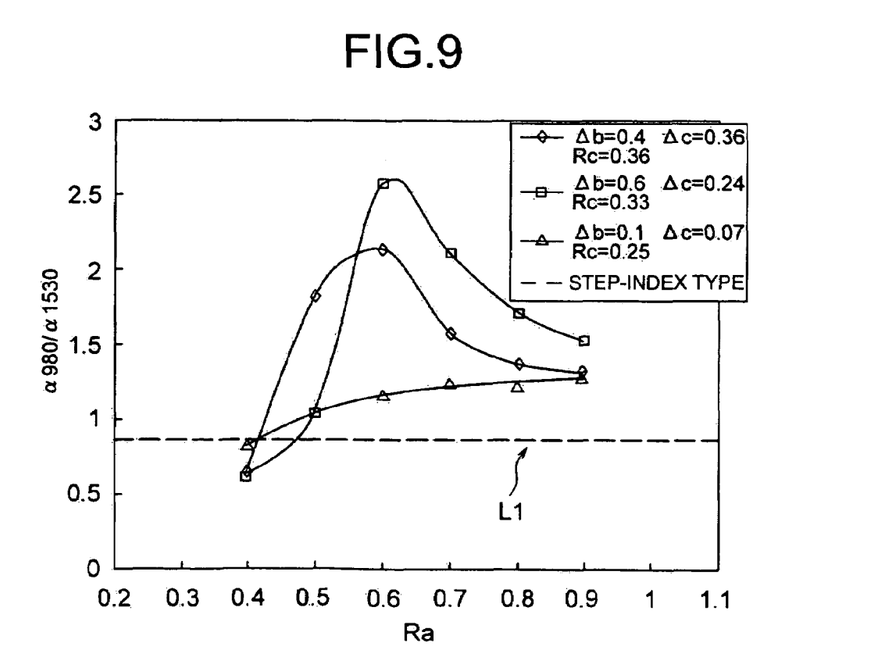
FIG. 9 is a graph of an Ra (=a/b) dependence of $\alpha_{980}/\alpha_{1530}$ in the W-seg type.

A further numerical simulation is performed to investigate a behavior of $\alpha_{980}/\alpha_{1530}$ according to the change of Ra when the cut-off wavelength λc is set to 900 nanometers. A result of the numerical simulation is shown in FIG. 9.

For each of the samples, Rc and the relative refractive index differences Δ1, Δ2, and Δ3 are fixed, and the value of Ra is changed within a range between 0.4 and 0.9. The Er concentration is set to 1000 wt.ppm, which is uniformly doped in the core. The fixed values of Rc and the relative refractive index differences Δ1, Δ2, and Δ3 are shown in Table 1.

TABLE 1

|  | Rc | Δ1 | Δ2 | Δ3 |
|---|---|---|---|---|
| Δb = 0.4<br>Δc = 0.36 | 0.36 | 1.0 | 0.4 | 0.36 |
| Δb = 0.6<br>Δc = 0.24 | 0.33 | 1.0 | 0.6 | 0.24 |
| Δb = 0.1<br>Δc = 0.07 | 0.25 | 1.8 | 0.18 | 0.13 |

From the result shown in FIG. 9, it is found that $\alpha_{980}/\alpha_{1530}$ increases with a peak at Ra=0.6. For the conventional step-index type (FIG. 3), $\alpha_{980}/\alpha_{1530}$ is 0.87 when the cut-off wavelength λc is 900 nanometers (see a dashed line L1 in FIG. 9). Therefore, if Ra is set to 0.5 or more, and optimally to a value within a range between 0.5 and 0.8, it is possible to obtain a larger $\alpha_{980}/\alpha_{1530}$ than the conventional step-index type.

Figure 10:
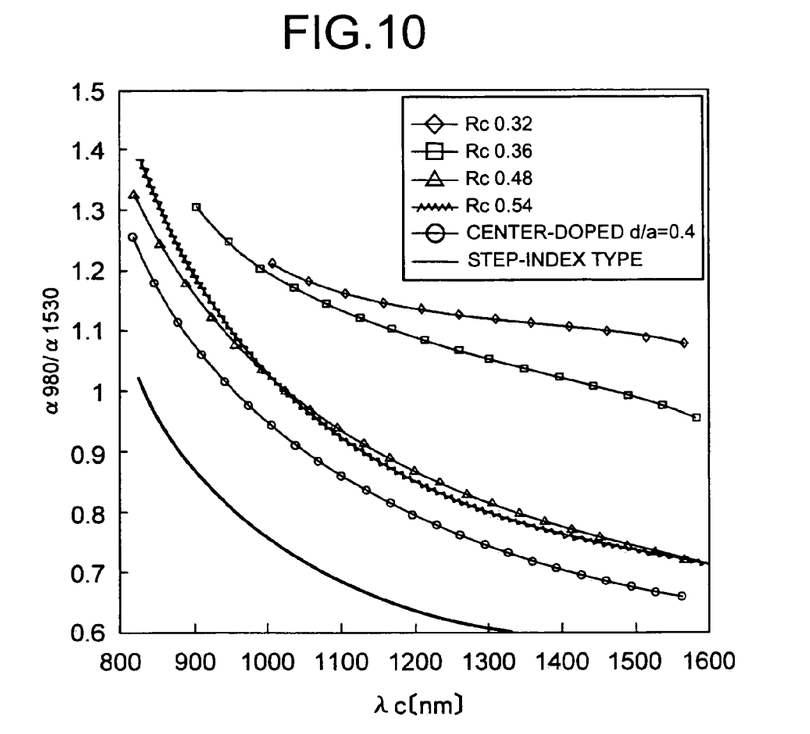
FIG. 10 is a graph of a cut-off wavelength λc dependence of $\alpha_{980}/\alpha_{1530}$ in the W-seg type by Rc (=a/c)

A fourth numerical simulation is carried out to see a behavior of a change of $\Delta_{980}/\alpha_{1530}$ according to a change of Rc with Ra and the relative refractive index differences Δ1, Δ2, and Δ3 fixed (Δb=0.4, Δc=0.36, Δ1=1.0, Δ2=−0.4, Δ3=0.36, and Ra=0.9). FIG. 10 is a graph of a result of the fourth numerical simulation, showing a relation between the cut-off wavelength λc and $\alpha_{980}/\alpha_{1530}$ when Rc is changed.

As shown in FIG. 10, $\alpha_{980}/\alpha_{1530}$ becomes large if the cut-off wavelength λc is on the short wavelength side regardless of a value of Rc. If Rc decreases (in other words, if the second cladding diameter c increases relatively to the core diameter a), a value of $\alpha_{980}/\alpha_{1530}$ increases. Furthermore, when comparing with the center-doped type shown in FIG. 6, it is found that the W-seg type can obtain a larger $\alpha_{980}/\alpha_{1530}$ than the center-doped type by setting Rc to an appropriate value (for example, a value smaller than 0.48).

A fifth numerical simulation is performed, based on the result of the fourth numerical simulation, to investigate the behavior of $\alpha_{980}/\alpha_{1530}$ according to the change of Rc when the cut-off wavelength λc is set to 900 nanometers, with Ra and the relative refractive index differences Δ1, Δ2, and Δ3 fixed (Δb=0.11, Δc=0.07, Δ1=1.8, Δ2=−0.2, Δ3=0.12, and Ra=0.7). The value of Rc is changed within a range between 0.14 and 0.5. The Er concentration is set to 1000 wt.ppm, which is uniformly doped in the core. A result of the fifth numerical simulation is shown in FIG. 11.

Figure 11:
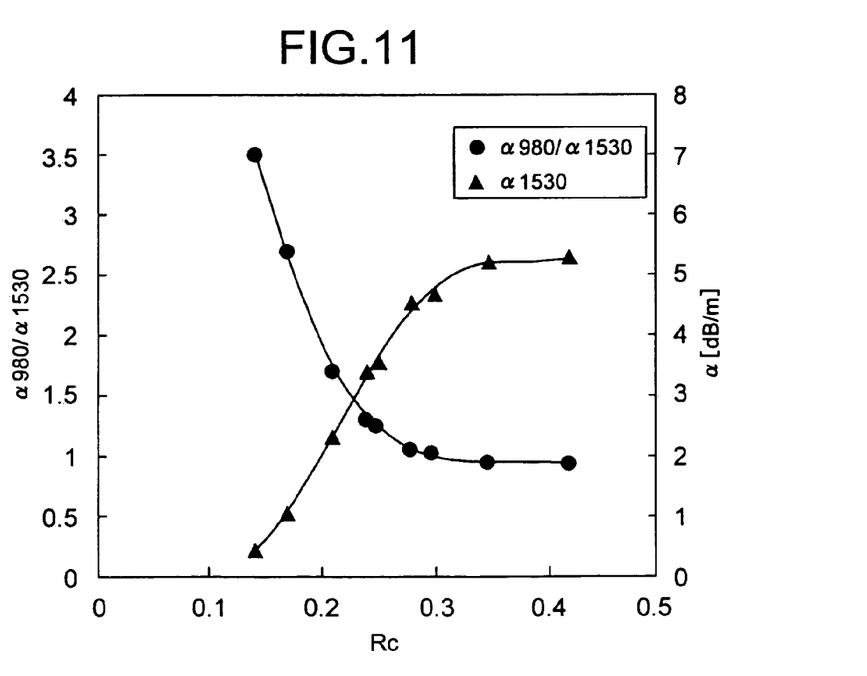
FIG. 11 is a graph of an Rc (=a/c) dependence of $\alpha_{980}/\alpha_{1530}$ in the W-seg type.

From the result shown in FIG. 11, it is found that although $\alpha_{980}/\alpha_{1530}$ increases with decrease of Rc, $\alpha_{1530}$ decreases considerably.

The absorption coefficient $\alpha_{1530}$ of the step-index type, when the cut-off wavelength λc is set to 900 nanometers, is about 5 dB/m to 6 dB/m, however, if Rc becomes 0.2 or less, the absorption coefficient $\alpha_{1530}$ shown in FIG. 11 becomes less than a half of the absorption coefficient $\alpha_{1530}$ of the step-index type. This is not desirable because a length of the EDF should be longer to compensate for a small absorption coefficient. It is desirable for the absorption coefficient $\alpha_{1530}$ to be not less than 2.0 dB/m to use the EDF as an amplification medium for the optical fiber amplifier. Therefore, in a design of the refractive index profile, both $\alpha_{980}/\alpha_{1530}$ and the absorption coefficient $\alpha_{1530}$ must be considered, which means that Rc of 0.2 or more is desirable, and 0.3 or more is even more desirable.

To increase $\alpha_{980}/\alpha_{1530}$ in the conventional center-doped type, it is necessary to narrow the Er-doped area. However, if the Er-doped area is narrowed, the absorption coefficient $\alpha_{1530}$ decreases.

A sixth numerical simulation is carried out to investigate behaviors of $\alpha_{980}/\alpha_{1530}$ and the absorption coefficient $\alpha_{1530}$ in the W-seg type. At the same time, $\alpha_{980}/\alpha_{1530}$ and the absorption coefficients $\alpha_{1530}$ of the conventional center-doped type and step-index type are also simulated for a comparison.

For each of the step-index type, the center-doped type, and the W-seg-type optical amplification fibers, the cut-off wavelength λc is set to 900 nanometers, and the Er concentration is set to 1000 wt.ppm. The relative refractive index difference of the core Δ1 is set to a common value (Δ1=1.0). For the center-doped type, the Er-doped area is set to four levels: 0.2, 0.4, 0.6, and 0.8. For the W-seg type, Δb is set to a value within a range between 0.2 and 0.6, Δc is set to a value within a range between 0.12 and 0.48, Ra is set to a value within a range between 0.6 and 0.9, and Rc is set to a value within a range between 0.35 and 0.54. The cladding and the third cladding are substantially made of $SiO_2$.

Figure 12:
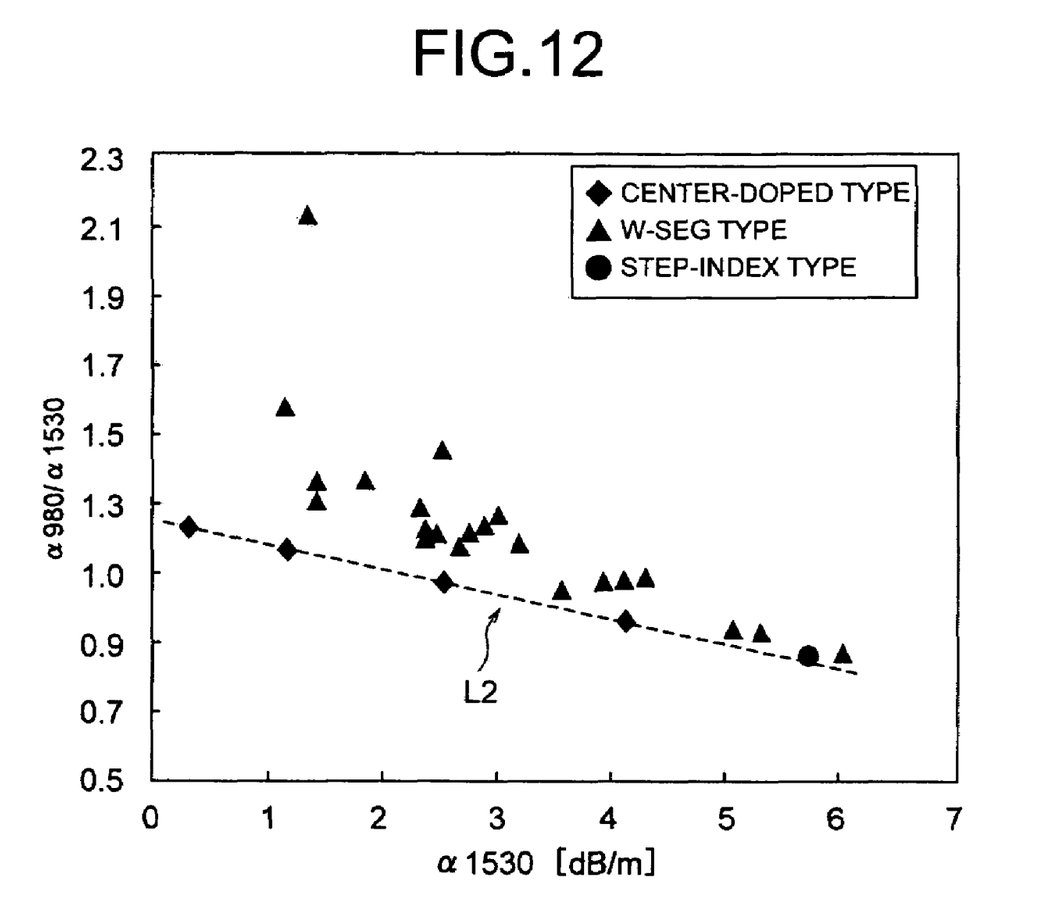
FIG. 12 is a graph for illustrating a behavior of an absorption coefficient $\alpha_{1530}$ and $\alpha_{980}/\alpha_{1530}$ in the step-index-type, the center-doped-type, and the W-seg-type optical amplification fibers.

Based on a result of the sixth numerical simulation, behaviors of the absorption coefficient $\alpha_{1530}$ and $\alpha_{980}/\alpha_{1530}$ with each of the parameters (Δb, Δc, Ra, and Rc) for each of the refractive index profiles are plotted in a graph shown in FIG. 12.

From the result shown in FIG. 12, it is found that, within the ranges of the above parameters, the W-seg type has a larger $\alpha_{980}/\alpha_{1530}$ than the step-index type and the center-doped type with respect to the same absorption coefficient $\alpha_{1530}$.

A relation between $\alpha_{980}/\alpha_{1530}$ and the absorption coefficient $\alpha_{1530}$ in the center-doped type is obtained as $\alpha_{980}/\alpha_{1530}=-0.0697\times\alpha_{1530}+1.25$ (a dashed line L2 in FIG. 12). Therefore, it is desirable that $\alpha_{980}/\alpha_{1530}$ and the absorption coefficient $\alpha_{1530}$ satisfy a relation $$\alpha_{980}/\alpha_{1530} > -0.0697\times\alpha_{1530}+1.30 \text{ and } \alpha_{1530} \geq 2.0 \text{ dB/m}.$$

The results of the above first to sixth numerical simulations are verified by an actual measurement using the W-seg-type optical amplification fibers 11, 12, and 13. A result of the actual measurement is shown in Table 2. Results of the actual measurement for a conventional step-index-type optical amplification fiber 14 and a center-doped-type optical amplification fiber 15 are also described in the Table for a comparison.

An optical fiber having the W-seg-type refractive index profile can be practically manufactured by doping a dopant to increase the refractive index, such as Ge, in the core and the second cladding that have higher refractive indexes than the third cladding, and by doping a dopant to decrease the refractive index, such as F, in the first cladding that has a lower refractive index than the third cladding.

The refractive index can be adjusted by changing a doping amount of Ge or F. In general, the cladding and the third cladding do not include a dopant to change the refractive index, such as Ge and F, being made of substantially $SiO_2$. Likewise, according to the present embodiment, the cladding and the third cladding are substantially made of $SiO_2$. However, the present invention is not limited to the present embodiment.

TABLE 2

| | optical amplification fiber 14 | optical amplification fiber 15 | optical amplification fiber 11 | optical amplification fiber 12 | optical amplification fiber 13 |
|---|---|---|---|---|---|
| structure of optical fiber | step-index type | center-doped type | W-seg type | W-seg type | W-seg type |

TABLE 2-continued

| | optical amplification fiber 14 | optical amplification fiber 15 | optical amplification fiber 11 | optical amplification fiber 12 | optical amplification fiber 13 |
|---|---|---|---|---|---|
| composition of core | Er2O3—Al2O3—GeO2—SiO2 | Er2O3—Al2O3—GeO2—SiO2 | Er2O3—Al2O3—GeO2—SiO2 | Er2O3—Al2O3—GeO2—SiO2 | Er2O3—Al2O3—GeO2—SiO2 |
| Δ1 [%] | 1.0 | 1.0 | 1.0 | 1.5 | 1.0 |
| Δ2 [%] | — | — | −0.4 | −0.55 | 0 |
| Δ3 [%] | — | — | 0.36 | 0.50 | 0.1 |
| a (=Er distribution diameter) [μm] | 3.40 | 1.36 | 2.40 | 2.30 | 2.70 |
| b [μm] | — | — | 2.66 | 2.99 | 5.40 |
| c [μm] | — | — | 5.33 | 5.06 | 10.8 |
| d [μm] | — | 3.40 | — | — | — |
| Ra | — | — | 0.90 | 0.77 | 0.50 |
| Rc | — | — | 0.45 | 0.45 | 0.25 |
| cut-off wavelength λc [nm] | 901.5 | 901.5 | 891.2 | 917.3 | 917.2 |
| Er-concentration [m$^{-3}$] | 8.9 × 10$^{24}$ | 8.9 × 10$^{24}$ | 8.9 × 10$^{24}$ | 8.9 × 10$^{24}$ | 8.9 × 10$^{24}$ |
| absorption coefficient $\alpha_{1530}$ [dB/m] | 5.725 | 1.116 | 2.372 | 3.088 | 2.061 |
| $\alpha_{980}/\alpha_{1530}$ | 0.867 | 1.184 | 1.215 | 1.246 | 1.515 |
| NF [dB] | 4.03 | 3.96 | 3.92 | 3.89 | 3.86 |

The optical amplification fibers 14, 15, and the optical amplification fibers 11, 12, and 13 are manufactured with the cut-off wavelength λc set to about 900 nm. For the step-index-type optical amplification fiber 14 and the W-seg-type optical amplification fibers 11, 12, and 13, Er is doped in the entire core area. The Er-concentrations and Al-concentrations for the optical amplification fibers 14, 15, and the optical amplification fibers 11, 12, and 13 are substantially same and uniform.

A condition for measuring the NF, when actually measuring the NF of the optical amplification fibers 14, 15, and the optical amplification fibers 11, 12, and 13, is that a forward pumping light of 980 nanometers emitted from a laser diode (LD) is used, and a fiber length measured has a constant absorption coefficient-length product (absorption coefficient at 1530 nanometers×length).

From the result shown in Table 2, it is found that the W-seg-type optical amplification fibers 11, 12, and 13 have a larger $\alpha_{980}/\alpha_{1530}$ than the optical amplification fibers 14, 15 having the conventional refractive index profile. Furthermore, the W-seg-type optical amplification fibers 11, 12, and 13 can obtain an increased $\alpha_{980}/\alpha_{1530}$ without decreasing the absorption coefficient $\alpha_{1530}$, resulting in a great improvement of the NF.

According to the present invention, it is possible to increase a population inversion without accompanying a considerable decrease of the absorption coefficient in a wavelength band of a pumping light, which makes it possible to greatly decrease the NF.

Even if a rare-earth concentration and a cut-off wavelength applied to conventionally used step-index type and center-doped type are employed, a ratio of the absorption coefficient αp in the pumping light wavelength band (i.e., the wavelength band with a peak at around 980 nanometers) to the absorption coefficient αs in a signal light wavelength band (i.e., the wavelength band with a peak at around 1530 nanometers) can be increased, making it possible to decrease the NF. As a result, an optical amplification fiber with greatly improved noise characteristics can be realized.

Furthermore, because αp/αs can be increased without decreasing the absorption coefficient αs in the signal light wavelength, it is possible to make a length of the optical amplification fiber shorter, compared to a case in which the conventional step-index type or center-doped type is used. Therefore, a compact size of the optical fiber amplifier can be realized.

Furthermore, in an optical communication system employing an optical amplification fiber according to the present invention, an error rate on a reception side is decreased, realizing a long-haul transmission of a quality signal light.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical amplification fiber for an optical fiber amplifier that amplifies a signal light using a pumping light, wherein an absorption coefficient of the optical amplification fiber satisfies conditional relations $$\alpha s \geq 2.0 \text{ dB/m}$$

$$\alpha p/\alpha s \geq -0.0697 \times \alpha s + 1.30$$

where αp is the absorption coefficient in a pumping light wavelength band, and αs is the absorption coefficient in a signal light wavelength band.

2. The optical amplification fiber according to claim 1, wherein a fiber cut-off wavelength λc is 1100 nanometers or less.

3. The optical amplification fiber according to claim 1, comprising:
 a core in which at least one rare-earth element is doped, the core having a first refractive index;
 a first cladding that surrounds the core, the first cladding having a second refractive index smaller than the first refractive index;
 a second cladding that surrounds the first cladding, the second cladding having a third refractive index higher than the second refractive index and smaller than the first refractive index; and
 a third cladding that surrounds the second cladding, the third cladding having a fourth refractive index smaller than the third refractive index.

4. The optical amplification fiber according to claim 3, wherein at least erbium is doped in the core as the rare-earth element.

5. The optical amplification fiber according to claim 3, wherein a ratio of a diameter of the core to a diameter of the first cladding is 0.5 or more.

6. The optical amplification fiber according to claim 3, wherein a ratio of a diameter of the core to a diameter of the second cladding is 0.2 or more.

7. The optical amplification fiber according to claim 3, wherein a ratio of a relative refractive index difference of the core with the third cladding to a relative refractive index difference of the second cladding with the third cladding is 0.36 or more.

8. An optical fiber amplifier that amplifies a signal light using a pumping light, the optical fiber amplifier comprising an optical amplification fiber, wherein
 an absorption coefficient of the optical amplification fiber satisfies conditional relations $$\alpha s \geq 2.0 \text{ dB/m}$$

$$\alpha p/\alpha s \geq -0.0697 \times \alpha s + 1.30$$

where αp is the absorption coefficient in a pumping light wavelength band, and αs is the absorption coefficient in a signal light wavelength band.

9. An optical communication system comprising:
 a transmitter that outputs a signal light;
 an optical fiber that propagates the signal light output from the transmitter; and
 an optical fiber amplifier that amplifies the signal light using a pumping light, wherein
 the optical fiber amplifier includes an optical amplification fiber of which an absorption coefficient satisfies conditional relations $$\alpha s \geq 2.0 \text{ dB/m}$$

$$\alpha p/\alpha s \geq -0.0697 \times \alpha s + 1.30$$

where αp is the absorption coefficient in a pumping light wavelength band, and αs is the absorption coefficient in a signal light wavelength band.

10. An optical amplification fiber comprising:
 a core in which at least one rare-earth element is doped, the core having a first refractive index;
 a first cladding that surrounds the core, the first cladding having a second refractive index smaller than the first refractive index;
 a second cladding that surrounds the first cladding, the second cladding having a third refractive index bigger than the second refractive index and smaller than the first refractive index; and
 a third cladding that surrounds the second cladding, the third cladding having a fourth refractive index smaller than the third refractive index.

11. The optical amplification fiber according to claim 10, wherein at least erbium is doped in the core as the rare-earth element.

12. The optical amplification fiber according to claim 10, wherein a ratio of a diameter of the core to a diameter of the first cladding is 0.5 or more.

13. The optical amplification fiber according to claim 10, wherein a ratio of a diameter of the core to a diameter of the second cladding is 0.2 or more.

14. The optical amplification fiber according to claim 10, wherein a ratio of a relative refractive index difference of the core with the third cladding to a relative refractive index difference of the second cladding with the third cladding is 0.36 or more.

15. An optical fiber amplifier that amplifies a signal light using a pumping light, the optical fiber amplifier comprising an optical amplification fiber, wherein the optical fiber includes
 a core in which at least one rare-earth element is doped, the core having a first refractive index;
 a first cladding that surrounds the core, the first cladding having a second refractive index smaller than the first refractive index;
 a second cladding that surrounds the first cladding, the second cladding having a third refractive index bigger than the second refractive index and smaller than the first refractive index; and
 a third cladding that surrounds the second cladding, the third cladding having a fourth refractive index smaller than the third refractive index.

16. An optical communication system comprising:
 a transmitter that outputs a signal light;
 an optical fiber that propagates the signal light output from the transmitter; and
 an optical fiber amplifier that amplifies the signal light using a pumping light, wherein
 the optical fiber amplifier includes an optical amplification fiber wherein the optical fiber has a core in which at least one rare-earth element is doped, the core having a first refractive index;
 a first cladding that surrounds the core, the first cladding having a second refractive index smaller than the first refractive index;
 a second cladding that surrounds the first cladding, the second cladding having a third refractive index bigger than the second refractive index and smaller than the first refractive index; and
 a third cladding that surrounds the second cladding, the third cladding having a fourth refractive index smaller than the third refractive index.

* * * * *